United States Patent
Doleh et al.

(10) Patent No.: US 6,216,455 B1
(45) Date of Patent: Apr. 17, 2001

(54) APPARATUS FOR CONVERSION OF ENERGY FROM THE VERTICAL MOVEMENT OF SEAWATER

(76) Inventors: Zakaria Khalil Doleh; Rany Zakaria Doleh, both of P.O. Box 7364; John Douglas Lock, P.O. Box 8652, all of Dubai (AE)

( * ) Notice: Subject to any disclaimer, the term of this patent is extended or adjusted under 35 U.S.C. 154(b) by 0 days.

(21) Appl. No.: 09/381,015

(22) PCT Filed: Mar. 11, 1998

(86) PCT No.: PCT/EP98/01571

§ 371 Date: Dec. 2, 1999

§ 102(e) Date: Dec. 2, 1999

(87) PCT Pub. No.: WO98/41758

PCT Pub. Date: Sep. 24, 1998

(30) Foreign Application Priority Data

Mar. 14, 1999 (NL) .................................................. 1005542

(51) Int. Cl.[7] .................................................. F03B 13/18
(52) U.S. Cl. .................................................. 60/398; 290/53
(58) Field of Search .................................. 60/398; 290/42, 290/53

(56) References Cited

U.S. PATENT DOCUMENTS

| 875,042 | * | 12/1907 | Bissell | 60/398 |
|---|---|---|---|---|
| 1,623,341 | | 4/1927 | Hare . | |
| 3,391,903 | * | 7/1968 | Peterson, Jr. | 60/398 X |
| 3,870,893 | * | 3/1975 | Mattera | 290/53 |
| 4,123,667 | | 10/1978 | Decker . | |
| 4,138,845 | * | 2/1979 | Kitabayashi | 60/398 X |
| 4,271,668 | * | 6/1981 | McCormick | 60/398 |
| 4,286,347 | * | 9/1981 | Modisette | 290/42 X |
| 4,341,959 | * | 7/1982 | Ambli | 290/53 |
| 4,441,316 | * | 4/1984 | Moody | 60/398 |
| 4,594,853 | | 6/1986 | Raichlen et al. . | |
| 4,719,754 | * | 1/1988 | Nishikawa | 60/398 X |
| 4,914,915 | | 4/1990 | Linderfelt | 60/502 |
| 5,186,822 | * | 2/1993 | Tzong et al. | 60/398 X |
| 5,374,850 | | 12/1994 | Cowen | 290/53 |
| 5,510,656 | * | 4/1996 | Wells | 290/53 |
| 5,770,893 | * | 6/1998 | Youlton | 290/53 |

FOREIGN PATENT DOCUMENTS

| 660770 | 6/1987 | (CH) . |
|---|---|---|
| 0063382 | 10/1982 | (EP) . |
| 0421010 | 4/1991 | (EP) . |
| 2233507 | 1/1975 | (FR) . |
| 2365039 | 4/1978 | (FR) . |
| 2370875 | 6/1978 | (FR) . |
| 2401329 | 3/1979 | (FR) . |
| 2449800 | 3/1980 | (FR) . |

\* cited by examiner

*Primary Examiner*—John E. Ryznic
(74) *Attorney, Agent, or Firm*—Webb Ziesenheim Logsdon Orkin & Hanson, P.C.

(57) ABSTRACT

An apparatus for conversion of energy from the vertical movement of seawater is made of a hollow body situated substantially upright on the sea bottom and provided with at least one aperture in a wall thereof. The water is free to move into and out of the hollow body. The apparatus also has a floating body moveable with respect to the hollow body in the vertical direction caused by the movement of the seawater level. The floating body is in communication with the space in the hollow body in order to change the volume thereof, so that a fluid flow is created inside the hollow body and is used to drive a propeller being connected directly or indirectly to an energy generator.

16 Claims, 9 Drawing Sheets

APPARATUS FOR CONVERSION OF ENERGY FROM THE VERTICAL MOVEMENT OF SEAWATER

BACKGROUND OF THE INVENTION

The invention relates to an apparatus for conversion of energy from the vertical movement of seawater comprising a hollow body being applied substantially upright on the sea bottom provided with at least one aperture in the wall thereof in such a way that water is free to move into and out of the hollow body.

The motion of seawater caused by waves, swell and tide is being used in many known proposals for the conversion of its energy.

The object of this invention is to improve this apparatus.

BRIEF SUMMARY OF THE INVENTION

This is achieved according to the invention by an apparatus for conversion of energy from the vertical movement of seawater comprising a floating body being movable with respect to said hollow body in vertical direction caused by the movement of the seawater level and being in communication with the space in said hollow body in order to change the volume thereof.

Upon increasing and decreasing the volume of the hollow body a fluid flow is introduced inside the hollow body. This fluid flow is used to drive a propeller being connected to energy generating means directly or indirectly.

The hollow body has preferably parallel side walls, whereas the floating body comprises a cap-like member for closing the top or bottom opening thereof. The cap-like member shifts along the side walls of the hollow body up and down along with the vertical movement of the seawater.

According to an embodiment of the invention the cap is provided with valve means being in communication with the open air, an outlet is arranged in the cap, the outlet being provided with valve means and being in communication with an air reservoir, whereas the air reservoir is in communication with a propeller being connected to energy generating means. In this embodiment the fluid flow introduced inside the hollow body comprises a liquid flow as well as an air flow, whereas the air flow is used to drive the propeller.

In an preferred embodiment the reservoir is located in said cap.

An acceleration of the fluid flow is obtained when the hollow body is provided with a narrowed passage between said side walls.

In another embodiment of the invention a propeller being connected to energy generating means is provided in the passage. In this embodiment fluid flow drives a propeller directly. As a result of the acceleration of the fluid in the passage optimal use has been made of the drive possibilities of the propeller.

When the cap is located above the seawater level, it is provided with at least one aperture. In this way the trapped air under the cap can be vented to the atmosphere. The cap can be provided with a lid fitting to said or each aperture, whereas the lid is actuated by pneumatic means. When it is desired the lid can be lifted from the aperture in order to vent the trapped air.

Preferably the floating body comprises the cap and at least one floating member being connected to the cap. The cap moves up and down by the action of the floating members.

The effect of the sea movements being transmitted to the cap by floating members may be amplified by a hydraulic amplifier comprising two pistons/cylinders of different diameter, one piston being connected to the floating member and the other piston being connected to the cap.

In order to obtain in some embodiments a one way rotation of the propeller the blades of the propeller are feathered in accordance with the direction of the fluid flow inside the hollow body.

In a preferred embodiment the blades are inserted on shafts which are attached to pinions which mate with racks, whereas said racks are attached to actuating means. In this way the blades are able to pivot into the right angle position in order to rotate the propeller one way independent of the direction of fluid flow.

In a preferred embodiment the actuating means are formed by plates being placed perpendicularly to the fluid flow within the hollow body at the top and/or bottom of the propeller. The force of the fluid flow within the passage pushes the blades of the propeller into the correct orientation.

In another embodiment of the invention the floating body comprises a membrane separating the fluid in the hollow body from the seawater and the fluid itself having a lower density than seawater. According to this embodiment no movable members are applied which require a guidance.

In this embodiment the type and volume of the fluid and the shape of the hollow body are selected such that upon a predetermined frequency of the vertical movement of the seawater level, the fluid is oscillated with its own natural frequency (resonance). The amplitude of oscillation of the fluid inside the hollow body will be maximized when the frequency of oscillation of the sea level coincides with the natural frequency of the fluid.

According to the invention it is possible to connect the outputs of a number of parallel positioned apparatus to a common shaft.

BRIEF DESCRIPTION OF THE SEVERAL VIEWS OF THE DRAWING

The invention is elucidated with the help of a drawing according to the enclosed figures.

DETAILED DESCRIPTION IF THE INVENTION

In every figure the hollow body is indicated with 1 and the floating body is indicated with 7.

Figure 1:
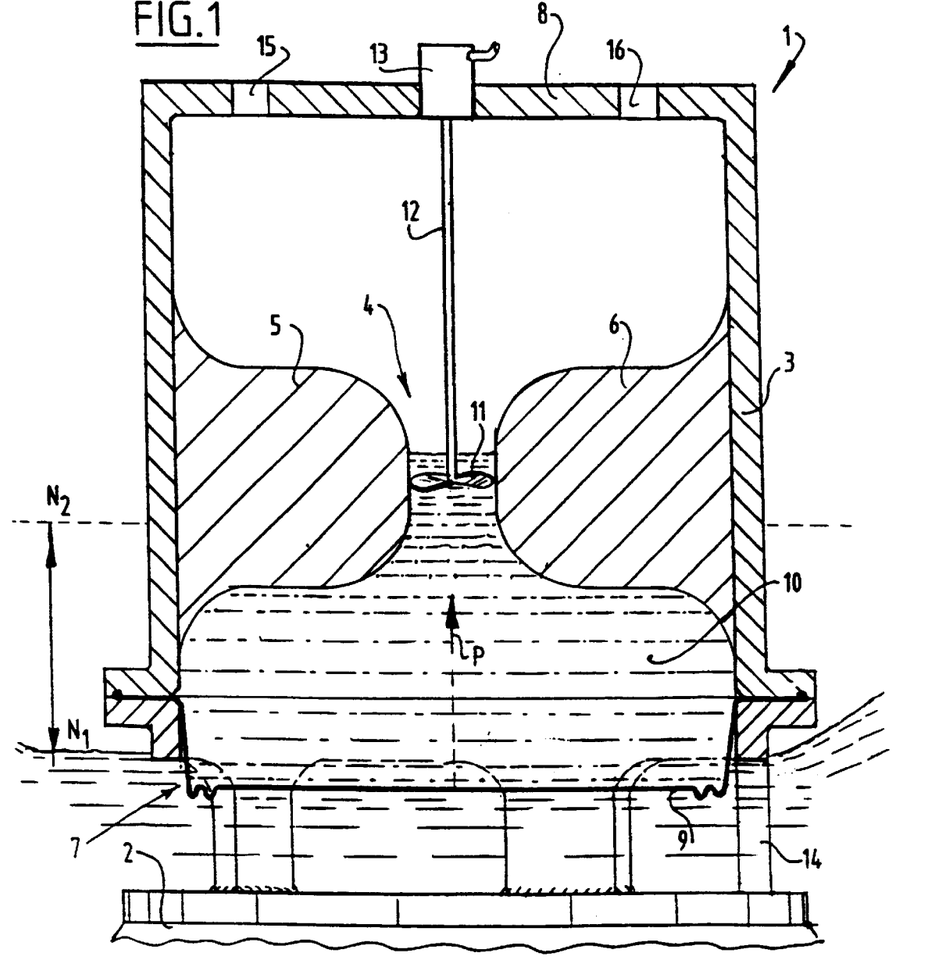
FIG. 1 shows a cross-sectional view of the first embodiment of the apparatus according to the invention.

The first embodiment of the apparatus according to FIG. 1 is applied to the sea bottom 2 and consists of a hollow body 1 with parallel side walls 3. Inside the hollow body 1 a narrowed passage 4 between the side walls is provided. The floating body 7 comprises a membrane 9 separating the fluid 10 in the hollow body 1 from the seawater and the fluid 10 itself.

A first space is defined by the inward extensions 5, 6, the wall 3 of the hollow body 1 and the flexible membrane member 9. During low level of the sea N1 the membrane 9 is in the drawn position whilst upon a high water level N2 the membrane 9 is displaced in the direction of the arrow P whereas the fluid 10 is moved from the first space in upward direction into the second space. The second space is situated in the upper part of the hollow body 1 and is defined by the inward extensions 5, 6, the wall 3 of the hollow body 1 and the top 8 of the hollow body 1. Due to the narrowed passage 4 the fluid inside the passage 4 is accelerated. The fluid displaced through the passage 4 drives a propeller 11. The propeller 11 is connected by means of a shaft 12 to a generator 13 for generating electrical energy. Upon lowering of the sea level from N2 to N1 the fluid inside the second space returns by means of gravity to the first space and drives the propeller 11 again. In the lower wall 3 of the hollow body 1 apertures 14 are provided for the inlet of seawater. At the top 8 the apertures 15, 16 are applied to let the air escape during the filling of the second space with fluid.

Figure 2:
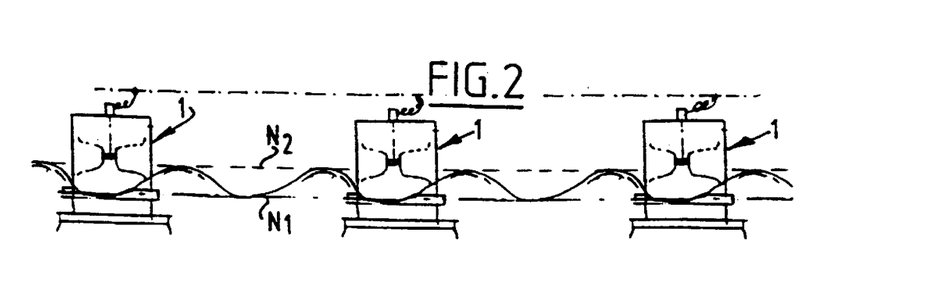
FIG. 2 shows diagrammically the arrangement of a number of parallel apparatuses according to figure

In FIG. 2 apparatuses according to the invention are standing parallel on the seabed. The outlet shaft of each apparatus is connected to a common shaft.

Figure 3:
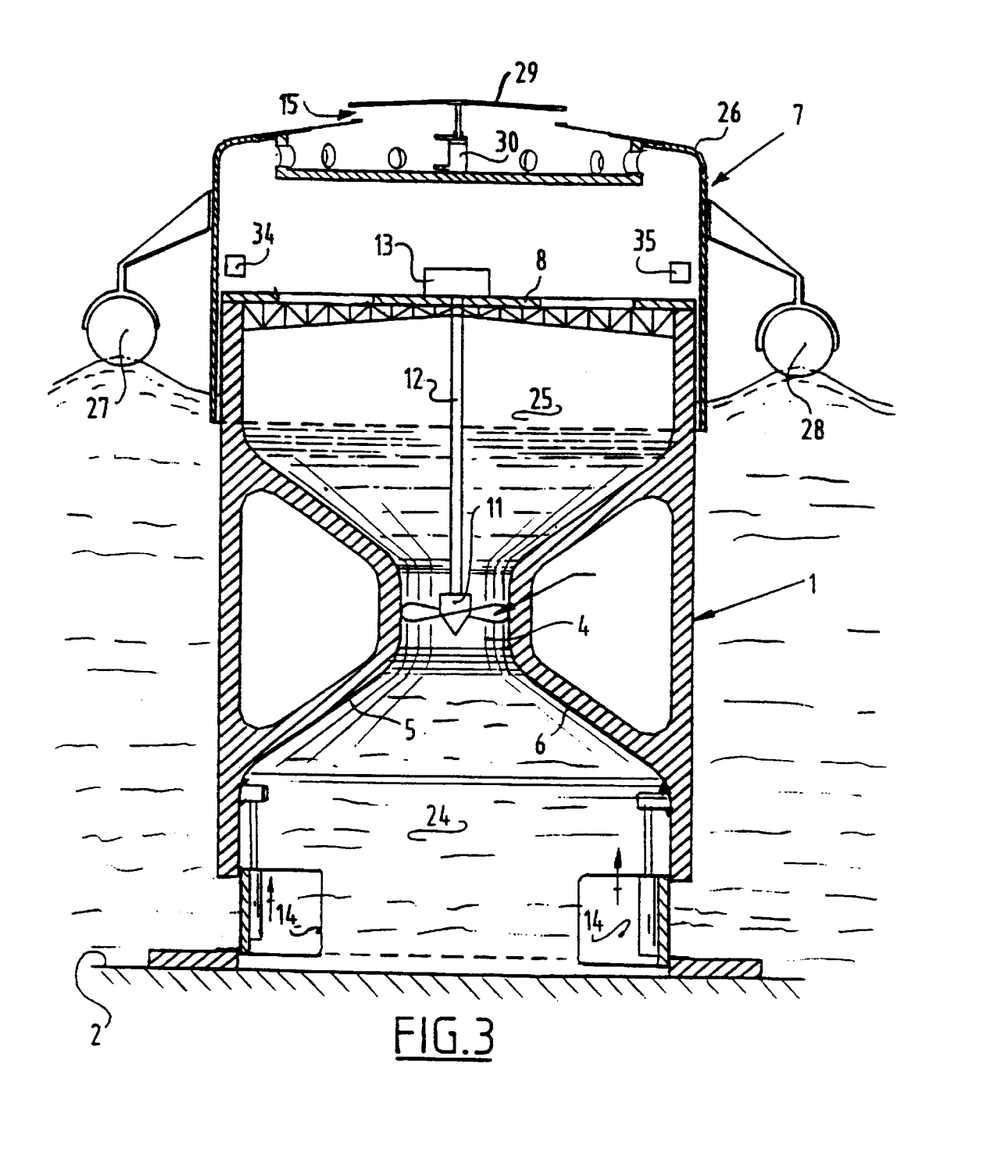
FIG. 3 shows a cross-sectional view of the second embodiment.

In the second embodiment according to FIG. 3 the apparatus comprises a hollow body. Inside the hollow body 1 a narrowed passage 4 is provided between inwardly extending parts 5, 6. Two spaces 24, 25 are provided on both sides of the passage 4. The top 8 of the hollow body 1 is covered by a cap 26 which is connected to floating members 27, 28. The floating body 7 comprises the cap 26 and the floating members 27, 28. The cap is closable by a lid 29. The lid 29 is movable by means of actuating means 30, for example pneumatic means, in order to vent the trapped air to the atmosphere. For resonance, the lid 29 will only be closed when the outer seawater level movement is in the same direction as and faster than that of the seawater level inside the body 1. If by the movement of the waves, which is transmitted by the floating members 27, 28 to the cap 29, the cap 29 moves up and down, the air being trapped between the cap 29 and the seawater level inside the body 1 will be compressed and expanded respectively so that the column of seawater will flow through the passage 4 and the turbine 11 will be driven. In order to regulate the volume of air inside the hollow body 1 the lid 29 can be closed or opened.

At the lower side of the hollow body 1 closable apertures 14 are provided. By this the length of the fluid column inside the hollow body 1 is adjustable, so that its natural frequency can be adjusted to the frequency of the movement of the seawater.

Inside the cap transducers 34, 35 are provided to measure the velocity of movement of the cap in relation to the top surface of the water column.

Figure 4:
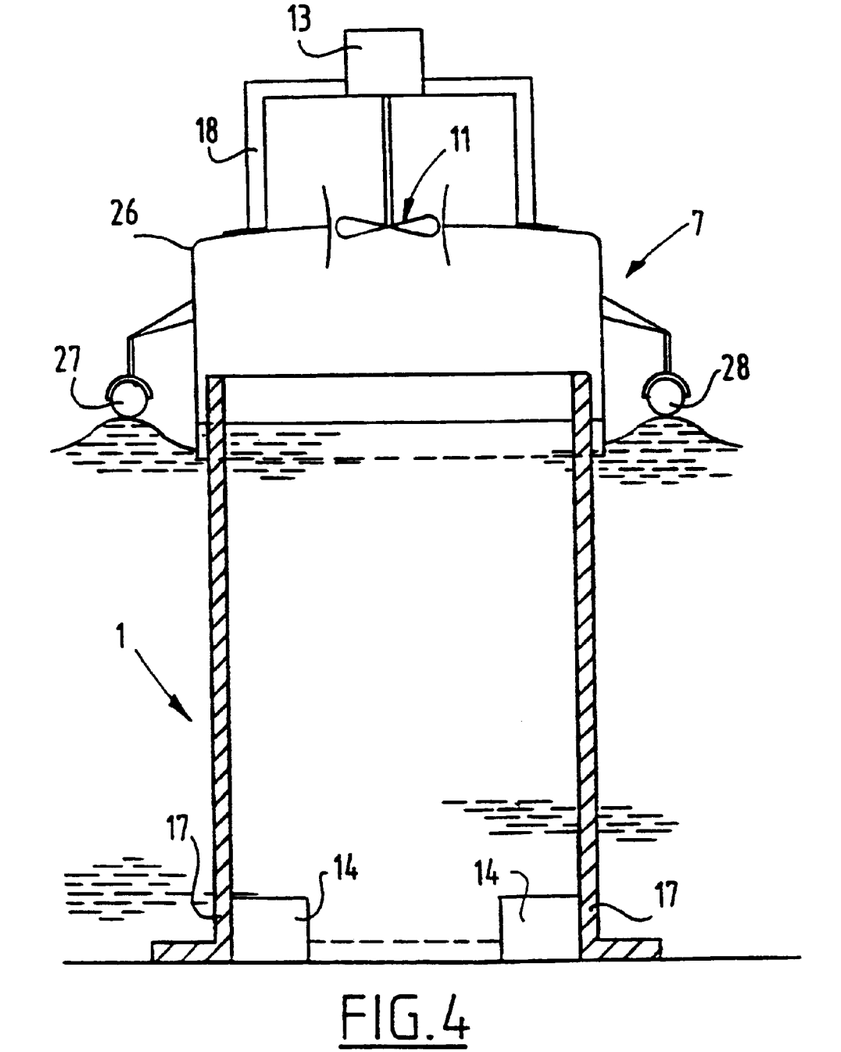
FIG. 4 shows a cross-sectional view of the third embodiment.

The third embodiment of the apparatus according to the invention is shown in FIG. 4. The apparatus comprises a hollow body 1 which stands on the sea bed by means of feet 17, leaving apertures 14 for the inlet of the seawater. The top of the hollow body 1 is enclosed by a cap 26 which is free to move up and down by the action of floating elements 27, 28 which are in turn moved by the sea waves. As the floating elements 27, 28 move upward on a wave, it will cause the cap 26 to move upward relative to the hollow body 1. An air propeller 11 is mounted onto the cap 26 and is connected to a generator 13 which is supported on the cap by frame 18.

This arrangement provides a dynamic system which is in effect a series connection of two springs.

The air which is compressed under the cap 26 behaves as a spring and the water in the hollow body 1 will behave like a spring as a result of archimedes principle. As the cap 26 moves, air will be compressed and stretched. This, in turn, will cause the water to oscillate in the hollow body 1. The propeller 11 will be equipped with blades which can be feathered so that the rotation will always be in the same direction regardless of the direction of movement of the cap 26. The level of damping applied by the propeller 11 must optimize the hydrodynamic behavior of the oscillating water column in the hollow body 1 so that the device is tuned to the primary frequency of the swell.

Figure 5:
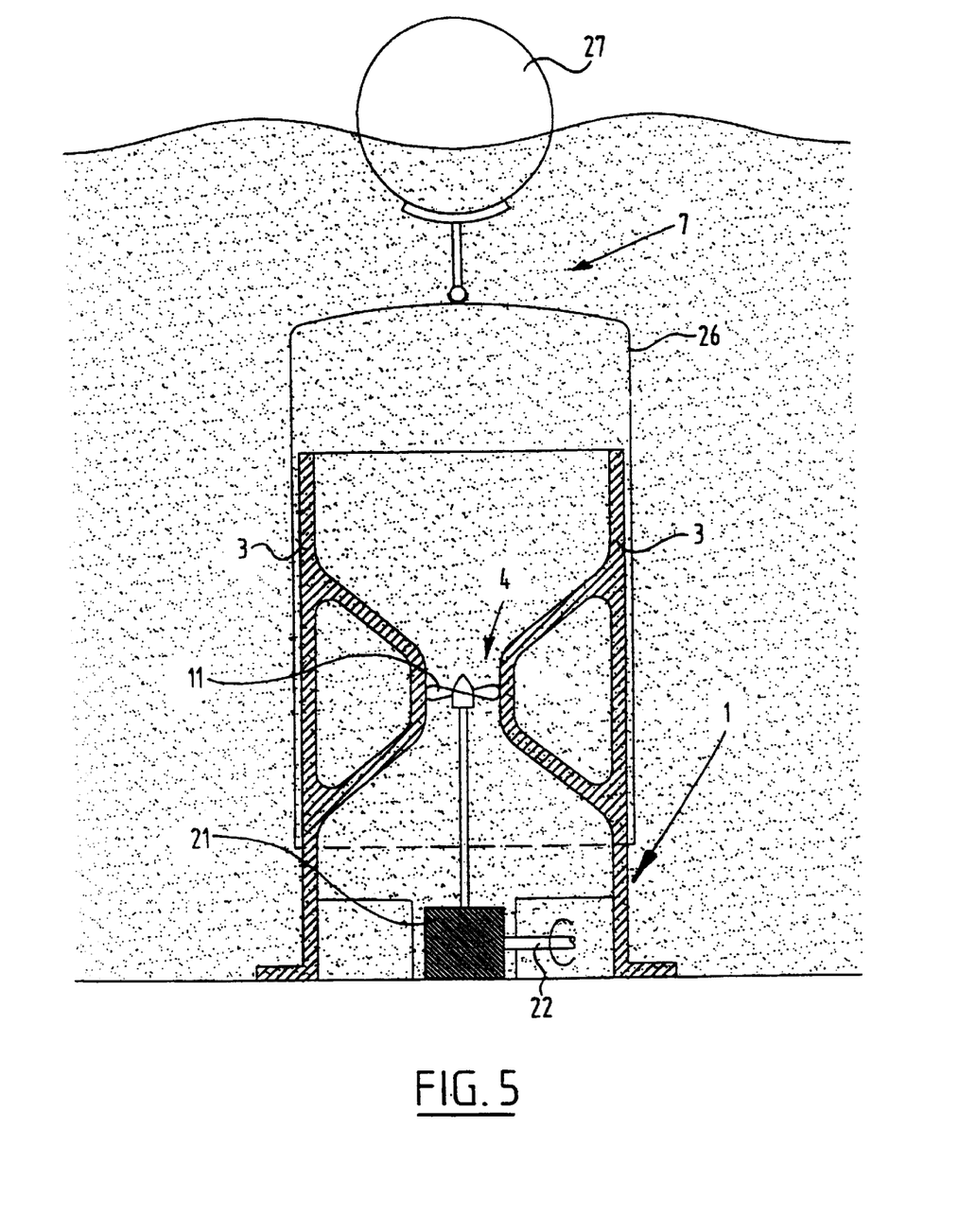
FIG. 5 shows a cross-sectional view of the fourth embodiment.

FIG. 5 shows another embodiment of the apparatus according to the invention. In contradiction to the embodiment of FIG. 3 this embodiment is completely located under the seawater level. Under the action of the floating element 27 the cap 26 is being moved up and down along the side walls 3 of the hollow body 1. The water flow through the passage 4 drives a propeller 11. The propeller 11 is connected through a gear box 21 to a drive shaft 22 which in turn may be geared to drive a generator which is situated above sea level at some distance from the hollow body 1.

Figure 6:
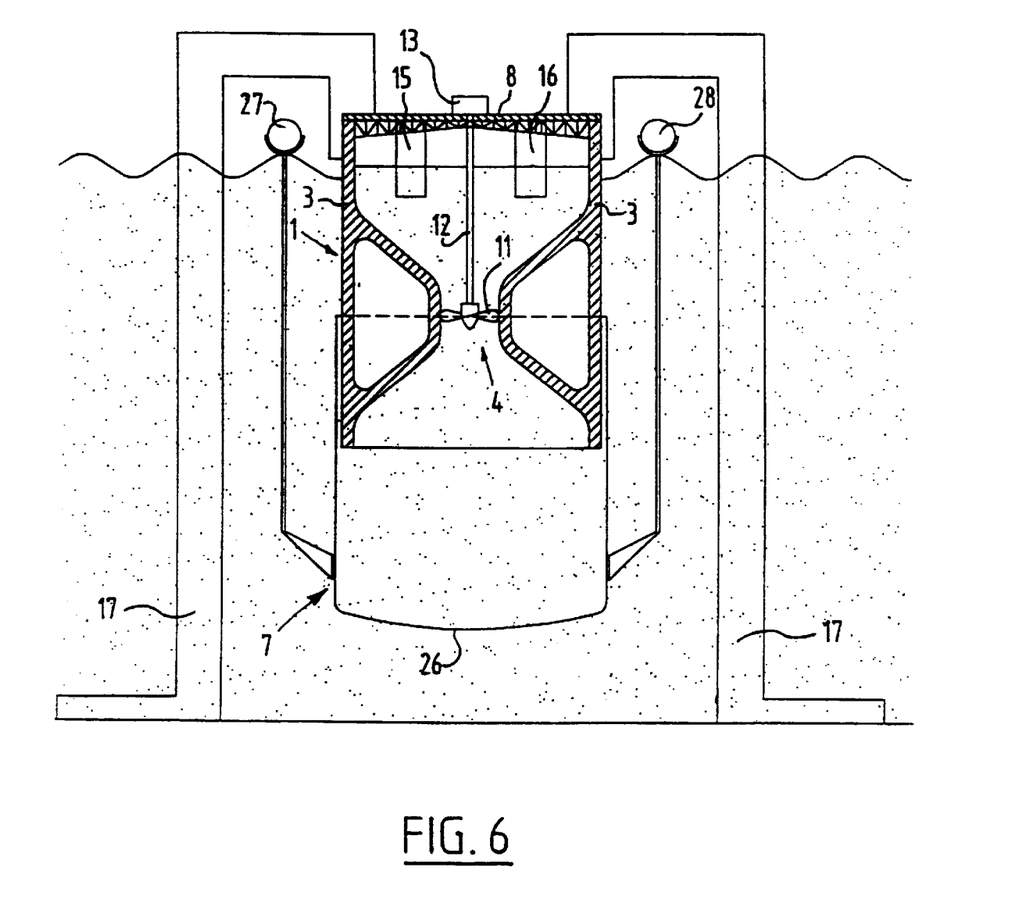
FIG. 6 shows a cross-sectional view of the fifth embodiment with another configuration of the cap and the hollow body.

FIG. 6 shows another configuration of the cap 26 and the hollow body 1. In this embodiment the generator 13 is situated at the top 8 of the hollow body 1 and the cap 26 is moved from below. In this case the hollow body 1 is supported by feet 17. Water is free to enter the top of the hollow body 1 through apertures 15, 16 which are positioned just below the seawater level of the lowest tide.

Figure 7:
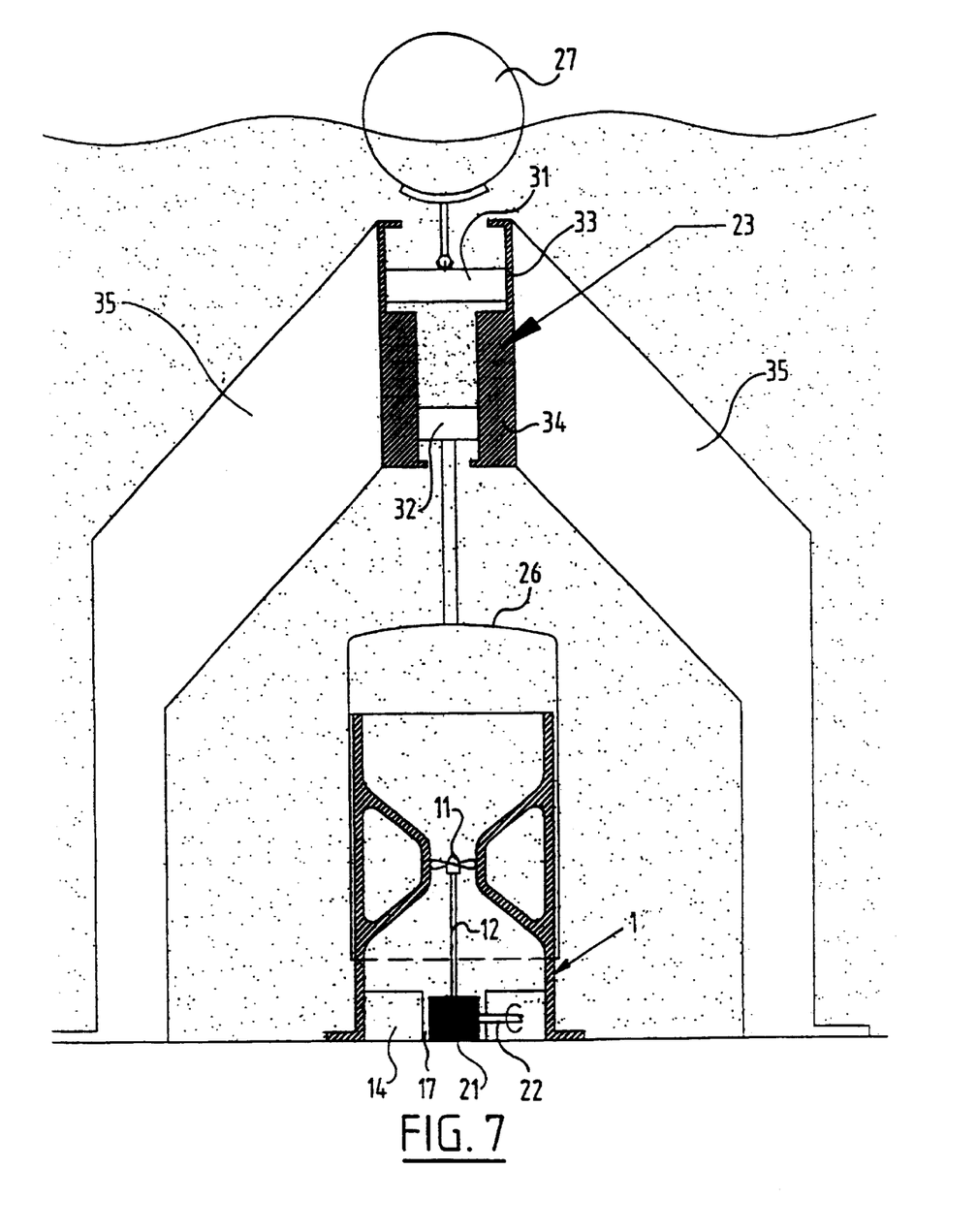
FIG. 7 shows a cross-sectional view of the sixth embodiment with a hydraulic amplifier.

In FIG. 7 an embodiment is shown which uses a hydraulic amplifier 23. The hydraulic amplifier 23 is supported by feet 35 which stand on the sea bed. The floating element 27 is connected to a piston 31 having a larger diameter than the piston 32 which is connected to the cap 26. The piston 31 connected to the floating element 27 moves in the upper part 33 of the amplifier 23 having the larger diameter and the piston 32 connected to the cap 26 moves in the lower part 34 of the amplifier 23 having the smaller diameter. It is clear that the cap 26 movement will be amplified with a gain which is given by the square of the ratio between the large and small diameters.

The embodiments of FIGS. 1, 3, 5, 6 and 7 using a propeller driven by the displacements of liquid, i.e. fluid 10 or seawater, have a disadvantage in that its rotation will be reversed as the fluid flow is reversed through the passage. This can be counteracted by using a propeller which allows the blades to be feathered in accordance with the direction of the fluid flow.

Figure 8A:
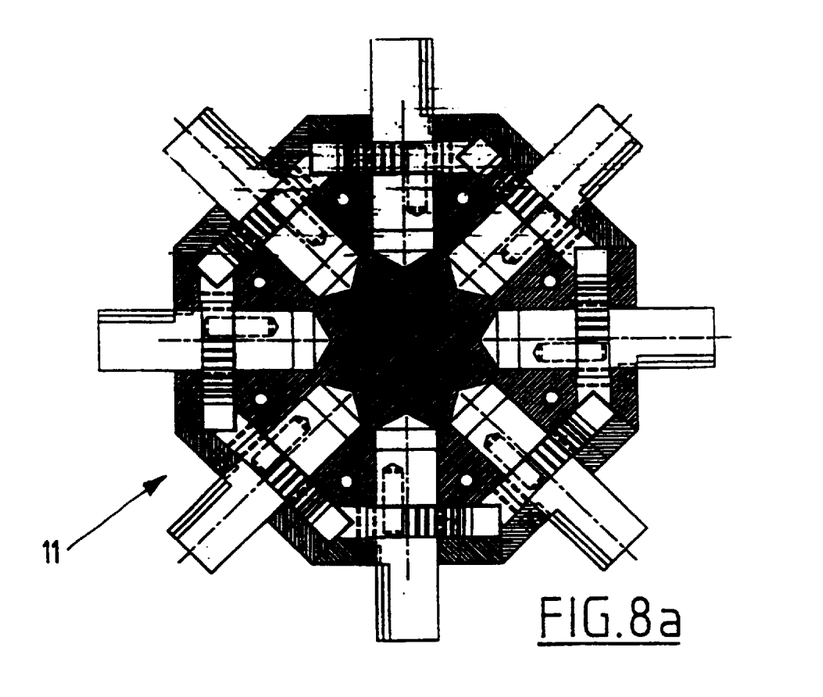
FIG. 8 shows an embodiment of the blades feathering according to the invention.
Figure 8B:
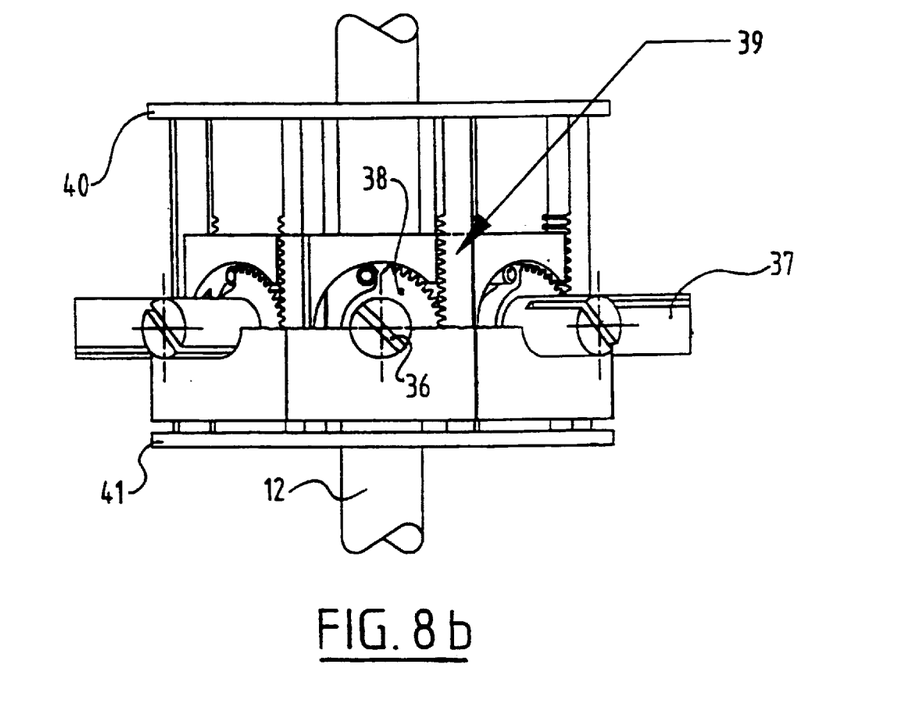

FIG. 8 shows a possible embodiment of a propeller 11 with featherable blades. The blades are not shown, but are held in slots 36, which are cut in the body of shafts 37. The shafts 37 are attached within the body of the propeller 11 to pinions 38 which mate with racks 39. The racks 39 are attached at the top and the bottom to plates 40, 41, which are free to move up and down along the propeller drive shaft 12. Referring to the drawing, if the top plate 40 is pushed downward, the racks 39 will rotate the pinions 38, so that the slots 36 are rotated clockwise through 90 degrees. This means that the blades will rotate through 90 degrees.

Conversely, if the bottom plate 41 pushes upward again the slots 36 will take up the orientation shown in the figure. If these rotations take place just on the point of reversal of fluid flow, the propeller 11 will continue to rotate in a uniform direction, thus minimizing inertia forces within the propeller 11.

Figure 9:
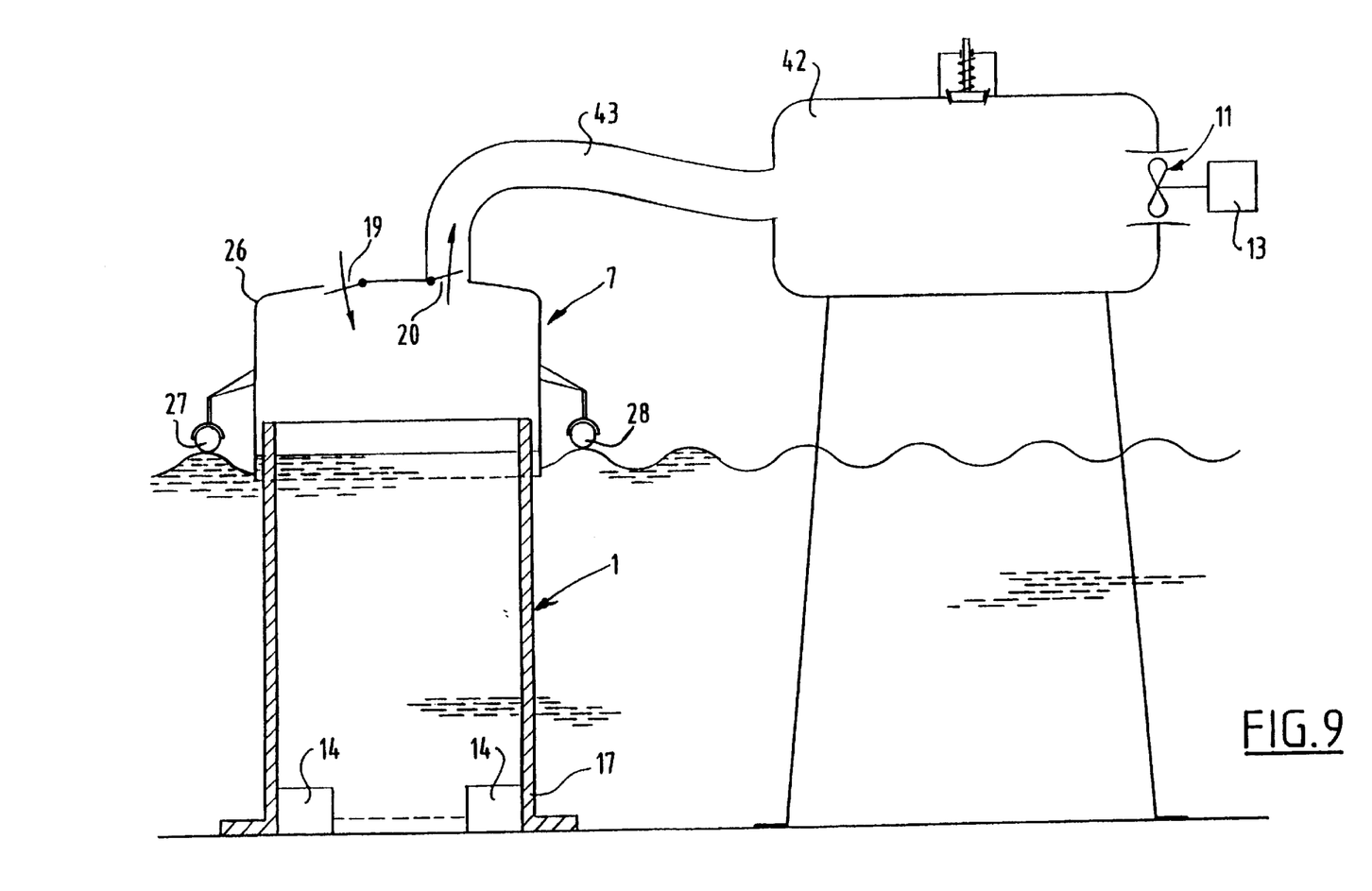
FIG. 9 shows a cross-sectional view of the seventh embodiment.

Another possibility of dealing with the reversed fluid flow problem is using an arrangement like that of FIG. 9. The cap 26 is provided with an inlet valve 19 being in communication with the open air and an outlet valve 20 being in communication with a reservoir 42 through a duct 43. The propeller 11 connected to the generator 13 is arranged in an outlet passage of the reservoir 42. On the upward stroke of the cap 26 air will be sucked in through inlet valve 19 whilst the outlet valve 20 remains closed. On the downward stroke the inlet valve 19 will close whilst the outlet valve 20 will open so that the air from under the cap 26 is transferred through duct 43 to the reservoir 42. The air in the reservoir is used to drive the propeller 11 which does not need to have featherable blades.

Figure 10:
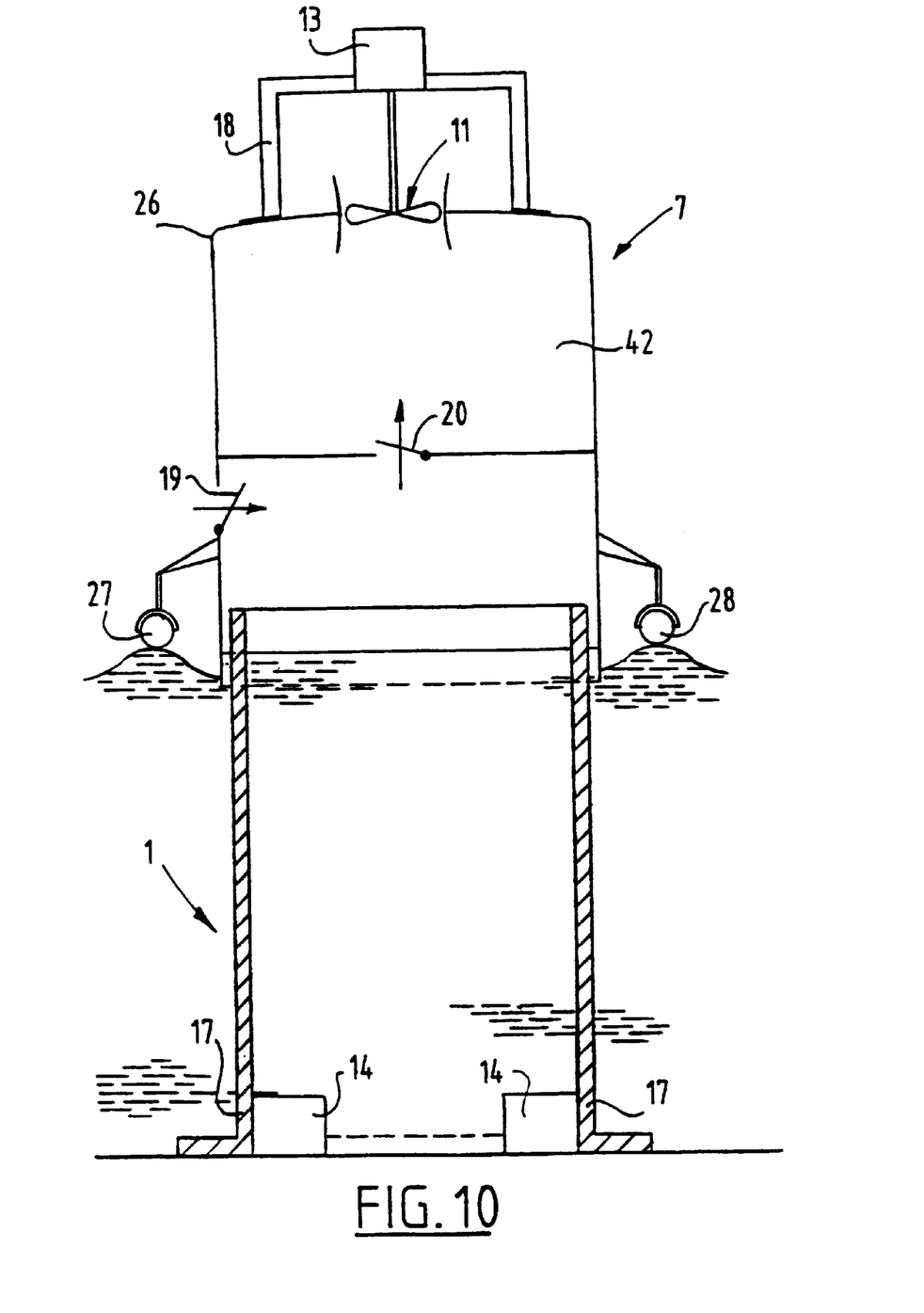
FIG. 10 shows a cross-sectional view of the eighth embodiment.

In the embodiment of FIG. 10 the reservoir 42 is advantageously provided under the cap 26. The functioning resembles that of the embodiment of FIG. 9, with the difference that air will be storage in the reservoir 42 under the cap 26 and will drive the propeller 11 which is mounted onto the cap 26.

In the embodiments using a cap 26, the cap 26 is free to rotate and means can be used to automatically position the cap 26 so as to allow the floating members 27, 28 to face the incoming wave front.

It is remarked that it is further possible to install a wind turbine for forcing swells in the sea level. This can be employed under circumstances that the sea is relatively calm whereas there is a strong wind. The conversion of wind energy into waves in the water can be done by any suitable means for example by blowing jet streams on the sea level or otherwise.

What is claimed is:

1. An apparatus for conversion of energy from movement of seawater in a vertical direction comprising:
   a) a hollow body being applied substantially upright on the sea bottom, having a wall surrounding a space defining a volume therein, and provided with at least one aperture in the wall thereof, in such a way that water is free to move into and out of the hollow body,
   b) a floating body being moveable with respect to said hollow body in said vertical direction caused by the movement of the seawater level,
   c) a propeller being connected to an energy generating means, and
   d) wherein the floating body is in communication with the space in said hollow body in order to change the volume thereof causing a fluid flow inside the hollow body to drive the propeller.

2. The apparatus according to claim 1, wherein said hollow body has parallel side walls and whereas said floating body comprises a cap-like member for closing the top or bottom opening thereof.

3. The apparatus according to claim 2, wherein said cap is provided with a valve being in communication with the open air, an outlet is arranged in said cap, said outlet being provided with a valve and being in communication with an air reservoir, whereas said air reservoir is in communication with the propeller being connected to energy generating means.

4. The apparatus according to claim 3 wherein said reservoir is located in said cap.

5. The apparatus according to claim 2, wherein said hollow by is provided with a narrowed passage between said side walls.

6. The apparatus according to claim 5, wherein the propeller is connected to energy generating means and is provided in said passage.

7. The apparatus according to claim 2, wherein the cap is provided with at least one aperture.

8. The apparatus according to claim 7, wherein the cap is provided with a lid fitting each of said apertures and wherein each lid is actuated to cover or expose the associated aperture.

9. The apparatus according to claim 2, wherein said floating body comprises said cap wherein and at least one floating member is connected to said cap.

10. The apparatus according to claim 9, further including a hydraulic amplifier comprising two pistons/cylinders of different diameter, one piston being connected to said floating member and the other piston being connected to said cap.

11. The apparatus according to claim 6, wherein the blades of said propeller are feathered in accordance with the direction of the fluid flow inside said hollow body.

12. The apparatus according to claim 11, wherein said blades are inserted on shafts which are attached to pinions which mate with racks, whereas said racks are attached to actuating means.

13. The apparatus according to claim 12, wherein said actuating means are formed by plates which are placed perpendicularly to the fluid flow within said passage at one or both of the top and bottom of said propeller.

14. The apparatus according to claim 1, wherein said floating body comprises a membrane which separates the fluid in said hollow body from the seawater, and wherein said fluid has a lower density than the seawater.

15. The apparatus according to claim 14, wherein the type and volume of said fluid and the shape of said hollow body are selected such that upon a predetermined frequency of the vertical movement of the seawater level, the fluid is oscillated with its own natural frequency.

16. The apparatus according to claim 1, wherein the outlet shaft of said apparatus is connected to a common shaft to which similar apparatus are also connected.

* * * * *

UNITED STATES PATENT AND TRADEMARK OFFICE
CERTIFICATE OF CORRECTION

PATENT NO. : 6,216,455 B1　　　　　　　　　　　　　　　　　　Page 1 of 1
DATED : April 17, 2001
INVENTOR(S) : Zakaria Khalil Doleh et al.

It is certified that error appears in the above-identified patent and that said Letters Patent is hereby corrected as shown below:

Column 2,
Line 45, "according to figure" should read -- according to FIG. 1 --.
Line 65, in the heading, "IF" should read -- OF --.

Column 6, claim 5,
Line 13, "hollow by" should read -- hollow body --.

Signed and Sealed this

Thirteenth Day of November, 2001

Attest:

*Nicholas P. Godici*

NICHOLAS P. GODICI
*Attesting Officer*　　*Acting Director of the United States Patent and Trademark Office*